(12) United States Patent
Fralick et al.

(10) Patent No.: US 6,684,695 B1
(45) Date of Patent: Feb. 3, 2004

(54) MASS FLOW SENSOR UTILIZING A RESISTANCE BRIDGE

(75) Inventors: Gustave C. Fralick, Middleburg Heights, OH (US); Danny P. Hwang, Strongsville, OH (US); John D. Wrbanek, Sheffield, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/267,110

(22) Filed: Oct. 8, 2002

(51) Int. Cl.[7] ................................................. G01F 1/68
(52) U.S. Cl. .................................................. 73/204.26
(58) Field of Search .......................... 73/204.26, 204.25, 73/204.24, 204.19, 204.15, 204.18, 204.17

(56) References Cited

U.S. PATENT DOCUMENTS

| | | | |
|---|---|---|---|
| 4,320,655 A | 3/1982 | Kammermaier et al. | |
| 4,478,077 A | 10/1984 | Bohrer et al. | |
| 4,542,650 A * | 9/1985 | Renken et al. ................ | 73/196 |
| 4,633,578 A | 1/1987 | Aine et al. | |
| 4,693,115 A * | 9/1987 | Tokura et al. ............ | 73/204.19 |
| 5,050,429 A | 9/1991 | Nishimoto et al. | |
| 5,243,858 A | 9/1993 | Erskine et al. | |
| 5,263,380 A | 11/1993 | Sultan et al. | |
| 5,493,906 A * | 2/1996 | Sen-Zhi ................... | 73/204.15 |
| 5,520,047 A | 5/1996 | Takahashi et al. | |
| 5,763,775 A | 6/1998 | Sato et al. | |
| 5,804,720 A | 9/1998 | Morimasa et al. | |
| 5,827,960 A | 10/1998 | Sultan et al. | |
| 5,965,811 A * | 10/1999 | Kawai et al. ............. | 73/204.26 |
| 6,131,453 A * | 10/2000 | Sultan et al. ............. | 73/204.26 |
| 6,349,596 B1 * | 2/2002 | Nakada et al. ............ | 73/204.26 |
| 6,550,325 B1 * | 4/2003 | Inushima et al. ......... | 73/204.26 |
| 6,557,411 B1 * | 5/2003 | Yamada et al. ........... | 73/204.26 |

* cited by examiner

Primary Examiner—Edward Lefkowitz
Assistant Examiner—Jewel V. Thompson
(74) Attorney, Agent, or Firm—Kent N. Stone

(57) ABSTRACT

A mass flow sensor to be mounted within a duct and measures the mass flow of a fluid stream moving through the duct. The sensor is an elongated thin quartz substrate having a plurality of platinum strips extending in a parallel relationship on the strip, with certain of the strips being resistors connected to an excitation voltage. The resistors form the legs of a Wheatstone bridge. The resistors are spaced a sufficient distance inwardly from the leading and trailing edges of the substrate to lie within the velocity recovery region so that the measured flow is the same as the actual upstream flow. The resistor strips extend at least half-way through the fluid stream to include a substantial part of the velocity profile of the stream. Certain of the resistors detect a change in temperature as the fluid stream moves across the substrate to provide an output signal from the Wheatstone bridge which is representative of the fluid flow. A heater is located in the midst of the resistor array to heat the air as it passes over the array.

21 Claims, 5 Drawing Sheets

MASS FLOW SENSOR UTILIZING A RESISTANCE BRIDGE

BACKGROUND OF THE INVENTION

1. Technical Field

The present invention relates to methods and apparatus for measuring and testing, and more particularly to measuring volume and mass rate of fluid flow. Still more particularly, the present invention relates to such method and apparatus which measure fluid flow by means of thermal sensing and resistive elements in a bridge circuit.

2. Background Information

To maximize efficiency in many internal combustion engines and other types of equipment, it is desirable that air inlet manifolds, and other fluid flow ducts, be equipped with sensors to measure fluid flow into the manifold. The prior art teaches numerous ways to measure fluid flow, which include vane anemometers, thermal hot wire anemometers and total pressure tubes. Thin film thermocouple rakes allow the sensor to be attached to a thin airfoil. While the prior art devices allow measurement of air intake flow rates, they do have certain limitations.

Hot wire anemometers are fragile and difficult to repair. Pitot tubes require intrusive piping into the manifold. Neither are able to determine the direction of air flow. Vane anemometers are subject to errors caused by the motion of the vehicle. Thin film thermocouple rakes on airfoils eliminate many of these problems, but require integration of signal to determine total flow. Fabrication of the two metal thermocouple rakes also requires two steps for fabrication.

Many of these disadvantages are overcome by an air flow sensor of the type shown in U.S. Pat. Nos. 5,629,481 and 6,131,453. These two patents use heated resistors and temperature sensors which connect to a Wheatstone resistance bridge to provide a bidirectional air flow sensing device which is based upon the sensed temperature differential as the air flow moves over heating elements. The various elements form legs of a Wheatstone bridge, the output of which provides the desired measurements. These prior art flow devices use substrates having the various sensing legs and components applied thereto by various techniques to provide for a compact, low cost and efficient device. Although these prior art devices may provide satisfactory results, the signal is reduced by the considerable parasitic resistance inherent in the design. More importantly, they measure only a relatively small portion of the flow stream, this may not provide the same accuracy as a sensor whose measurements are taken across a larger part of the flow stream.

Thus a need exists for an improved sensor for measuring manifold input flow rates.

BRIEF SUMMARY OF THE INVENTION

It is an object of the present invention to provide a fluid flow sensor which reliably and cost effectively measures the mass flow of a fluid moving through a manifold.

It is a further object of the present invention to provide a fluid flow sensor which minimizes flow disturbance by locating the sensing elements on an airfoil substrate sufficiently downstream from the leading edge of the substrate containing the sensor elements so that the leading edge disturbance has dissipated.

It is a further object of the present invention to provide a fluid flow sensor which is simple to fabricate in one step requiring no etching or multiplicity of layers, thereby reducing the cost thereof, and which can be easily scaled to almost any desired size for a particular application.

It is a still a further object of the present invention to provide a fluid flow sensor which simplifies signal conditioning, and in which the parasitic resistance is very low since almost all of the resistance of the sensors participate in the measurement, thereby increasing signal to noise ratio.

Another feature of the present invention is that the airfoil design is such that the measured flow is the same as the actual upstream flow.

A further feature of the design is the ability to fabricate the sensor with half of the bridge circuit on each side of the airfoil or substrate, making alignment with the airflow less critical. In addition, temperature sensors may be mounted on the substrate, allowing the determination of the temperature of the gas, necessary to accurately measure mass flow.

These and other objects are met by the present invention which is a sensor for measuring mass flow in a fluid stream having an upstream direction and an opposed downstream direction. This sensor includes a first resistor whose function is to measure the temperature of the gas is positioned in the fluid stream.

A fluid heater is positioned in the fluid stream in downstream relation to the first resistor.

A second resistor is positioned in the fluid stream downstream in relation to the fluid heater. Its function is to measure the gas temperature if the flow has reversed.

Also encompassed by the present invention is a sensor array surrounding the heater for measuring mass flow in a fluid stream having a downstream direction in the direction of mass flow and an upstream direction opposed to the direction of mass flow. It also assumes an excitation voltage source having positive and negative poles. The sensor is arranged as a Wheatstone bridge comprising positive and negative excitation ports and a first and second signal port and first and second parallel pair of resistors. One of the first parallel pair of resistors is interposed between the first positive excitation port and the second signal port, and the other of said first parallel pair of resistors is interposed between the first negative excitation port and said first signal port. The first pair of resistors is positioned in the fluid stream in upstream relation to the fluid heater, and one of said second parallel pair of resistors is interposed between the second positive port and first signal port. The other of said parallel resistors is interposed between said second negative excitation port and second signal port and said second pair of resistors are positioned in the fluid stream in downstream relation to the fluid heater.

It is understood that there is an external voltage difference circuit (differential amplifier) having two input terminals and an output terminal. The two input terminals of the circuit are connected to the signal ports of the sensor. The output of voltage difference circuit is proportioned to the difference in voltage of the two signal ports of the sensor, which, in turn, is proportioned to the mass flow of the fluid in the ducts.

BRIEF DESCRIPTION OF THE DRAWINGS

Preferred embodiments of the invention, illustrative of the best modes in which applicant contemplates applying the principles, are set forth in the following description and are shown in the drawings and are particularly and distinctly pointed out and set forth in the appended claims.

DETAILED DESCRIPTION OF THE INVENTION

Figure 1:
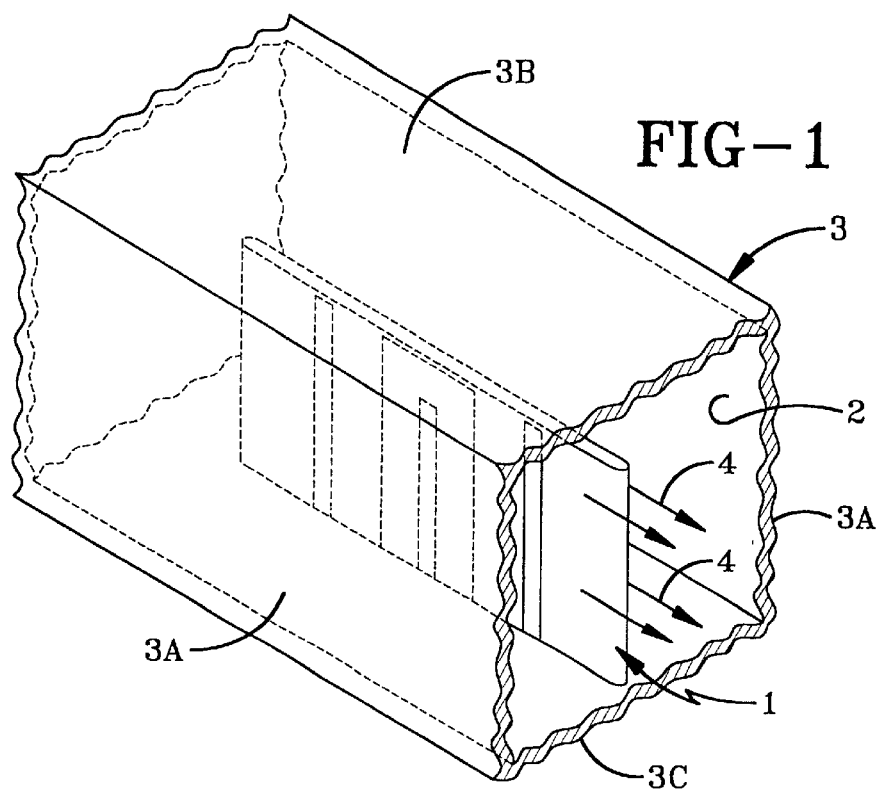
FIG. 1 is a diagrammatic perspective view showing the mass flow sensor mounted within a duct.

The mass flow sensor of the present invention is indicated generally at 1, and is shown in FIG. 1 mounted within the hollow interior 2 of a rectangular-shaped duct 3 through which a fluid stream 4 is moving as shown by the flow arrows. Duct 3 has spaced side walls 3A, a top wall 3B and a bottom wall 3C. Fluid stream 4 can be air or various other types of gases. Duct 3 can be the intake manifold adjacent to a vehicle or other type of equipment and also can have various other shapes such as round, oval, etc. and need not be rectangular as shown in FIG. 1.

Figure 2:
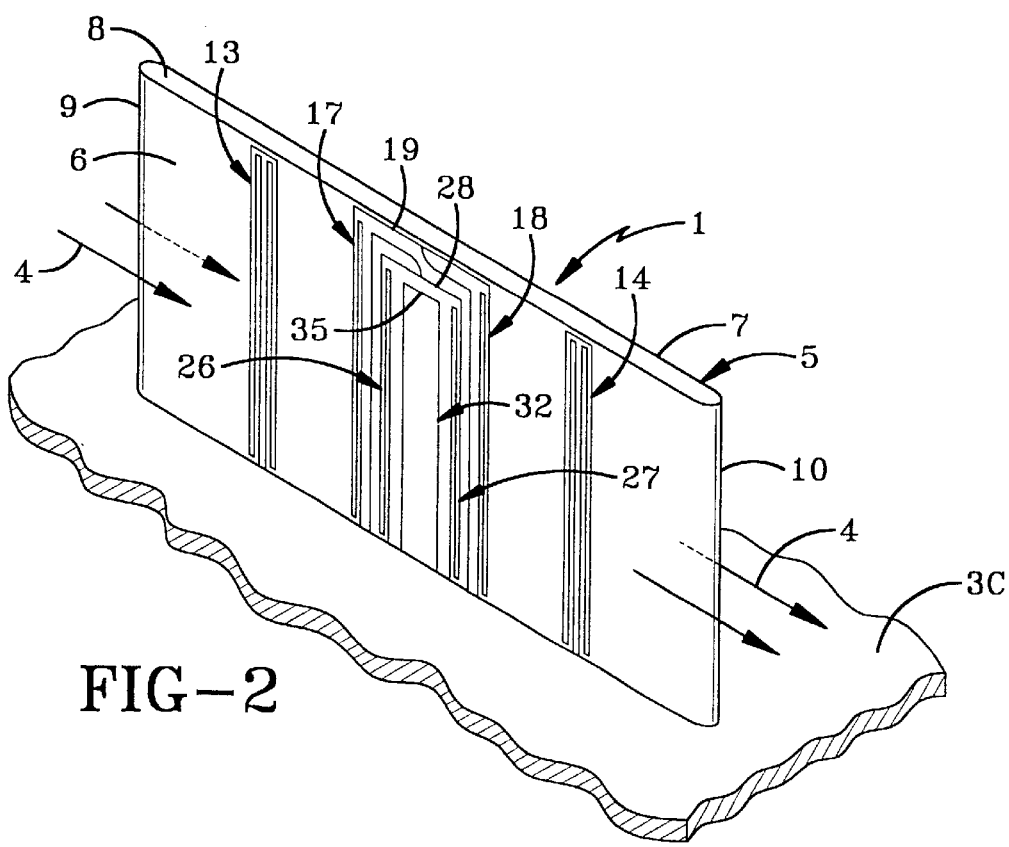
FIG. 2 is an enlarged fragmentary perspective view with portions broken away of the mass flow sensor and duct as shown in FIG. 1.

Flow sensor 1, as shown in FIG. 2, preferably has a generally constant thickness and includes a quartz substrate or airfoil 5 which has an elongated, thin rectangular-shaped configuration with spaced side surfaces 6 and 7, a top edge 8 and end edges 9 and 10. Edges 9 and 10 will be referred to as the upstream and downstream edges respectively, based upon the flow direction of fluid stream 4, and preferably will be tapered to reduce flow disturbance. The quartz substrate has been found to be most satisfactory since the sensor depends upon the flow induced temperature differences across the heater or resistors as discussed further below, and the low thermal conductivity of the quartz helps to maintain this difference. Likewise, quartz has an excellent resistance to thermal shock and thermal stress, and even if operated at high temperatures, the substrate will not crack.

In accordance with the invention (FIGS. 2 and 5), upstream and downstream resistive temperature devices (RTD's) 13 and 14 are provided adjacent edges 9 and 10, respectively for the purpose of measuring upstream temperature, each having a pair of terminal connectors, 13A, 13B and 14A, 14B, respectively. A pair of resistors 17 and 18 are connected in series by a strip 19 which in turn is connected to a readout terminal connector 20 by connecting strip 21. Resistors 17 and 18 terminate in terminal connectors 23 and 24, respectively. A second pair of resistors 26 and 27 are formed on substrate 5 and are connected in series by a horizontally extending strip 28 which is connected to a readout terminal connector 29 by a strip 30. Resistors 26 and 27 terminate in terminal connectors 26A and 27A, respectively.

In further accordance with another feature of the invention, a heater indicated generally at 32, is mounted centrally between spaced resistor pairs 17, 18, and 26, 27. Heater 32 preferably consists of a pair of vertically extending strips 33 and 34 which extend parallel to each other and to the resistors 17, 18 and 26, 27, respectively, and are connected in series by an upper horizontal strip 35. Heater strips 33 and 34 each terminate in a pair of terminal connectors 33A, 33B and 34A, 34B, respectively. Terminal connectors 33A and 34B connect heater 32 to a power source (not shown) for heating the heater filaments, with terminal connectors 33B and 34A being connected to power monitoring circuitry (not shown). As shown in the drawings the various resistors and heater strips extend parallel to each other and to leading and trailing edges 9 and 10, respectively, and are in full contact throughout their lengths with the moving fluid stream.

Preferably, heater strips 33 and 34 and the remaining strips are formed of thin films of platinum. The films are only a few microns thick so as not to disturb the flow over the side surfaces of the quartz substrate. Platinum is the ideal material for the heater because its electrical resistance varies with temperature in a very repeatable fashion which allows automatic control of the heater temperature as part of a control circuit. Also the stability and repeatability of platinum makes it the ideal material for the other strips, and the use of the same material for the heater and all of the other strips, permits the sensor to be fabricated in one step. The actual deposition of the various film strips preferably is via a photolithographic process, although other types of processes could be used without effecting the mass flow sensor of the present invention.

Figure 5:
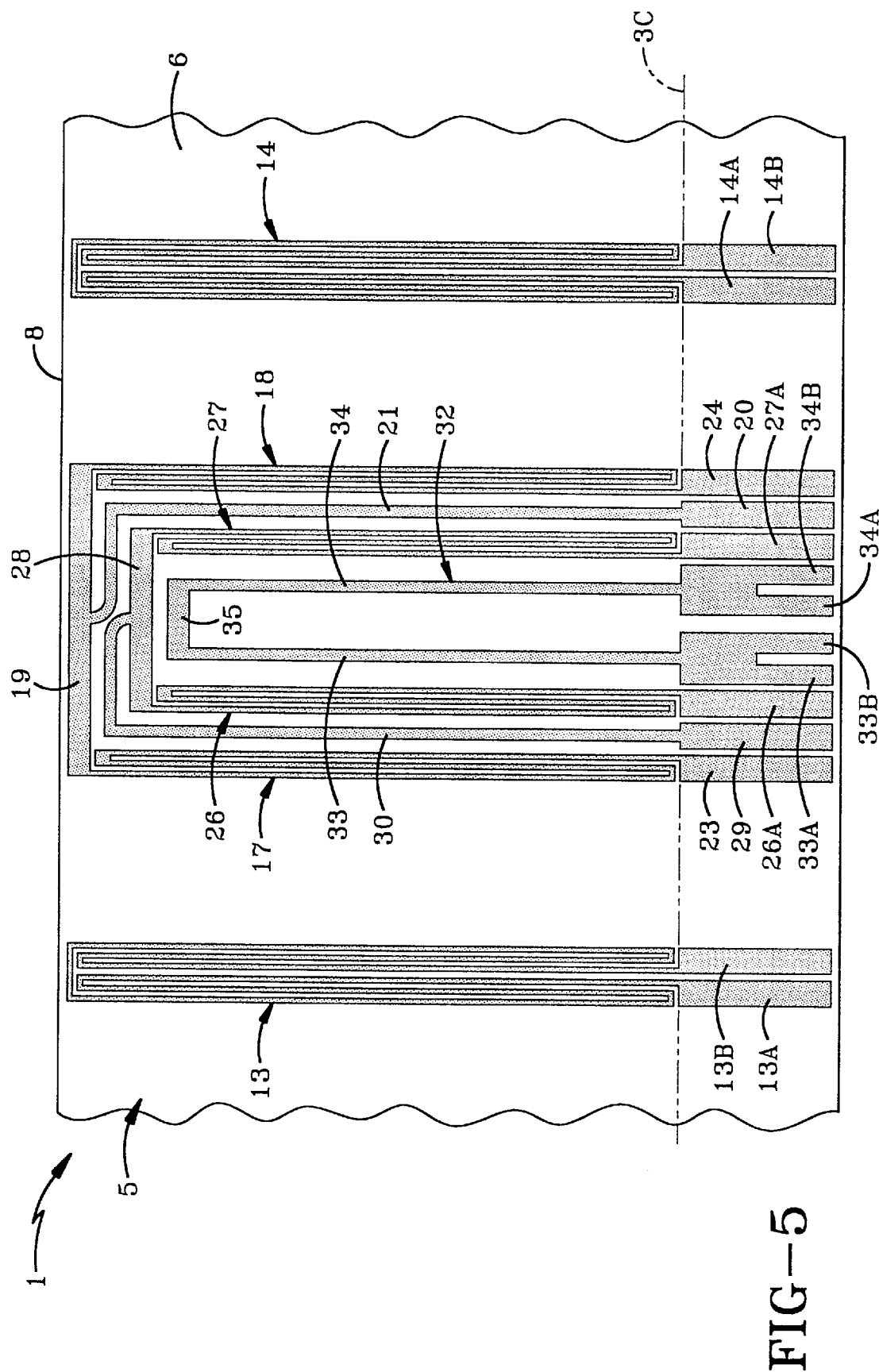
FIG. 5 is an enlarged side elevational view of the mass flow sensor.

The mass flow sensor shown particularly in FIG. 5, has fourteen terminal connectors along the bottom of the substrate as discussed above, which are usually located outside of the flow duct, that is, below bottom wall 3C thereof as shown in FIGS. 1 and 2, and represented by dot dash lines in FIG. 5. Eight of the terminal connectors, namely, terminal connectors 33B and 34A of heaters 32 and 33, terminal connector 20 and 29 and the RTD connectors 13A, 13B, 14A, and 14B are for readouts, with six of the terminal connectors, namely, heater terminal connectors 33A and 34B, and resistor terminal connectors 23, 26A, 27A, and 24 are for power or bridge excitation. Terminal connectors 23 and 27A provide a positive excitation voltage to resistors 17 and 27 and terminal connectors 26A and 24 provide a negative excitation voltage to resistors 26 and 18. Readout terminal connectors 29 and 20 are for the Wheatstone bridge output. Terminal connectors 33B and 34A are for voltage monitoring of the heater filaments and the outer four terminal connectors 13A, 13B, 14A, and 14B are for monitoring the temperature of RTD's 13 and 14.

The manner of operation of mass flow sensor 1 is shown in particular in FIG. 2 wherein fluid stream 4 moves along both side surfaces 6 and 7 of substrate 5 and passes over two of the sensing legs, namely, resistors 17 and 26, before it is heated by heater 32. The heated air then passes over and raises the temperature of resistors 27 and 18 causing their resistance to increase. The resistors are connected as a Wheatstone bridge circuit, indicated generally at 38, and shown in FIG. 6. This temperature difference, caused by the fluid stream passing over heater 32 and then over resistors 27 and 18, unbalances the bridge causing a voltage difference that is amplified and then calibrated to the mass flow rate as described further below with respect to FIG. 6.

Figure 6:
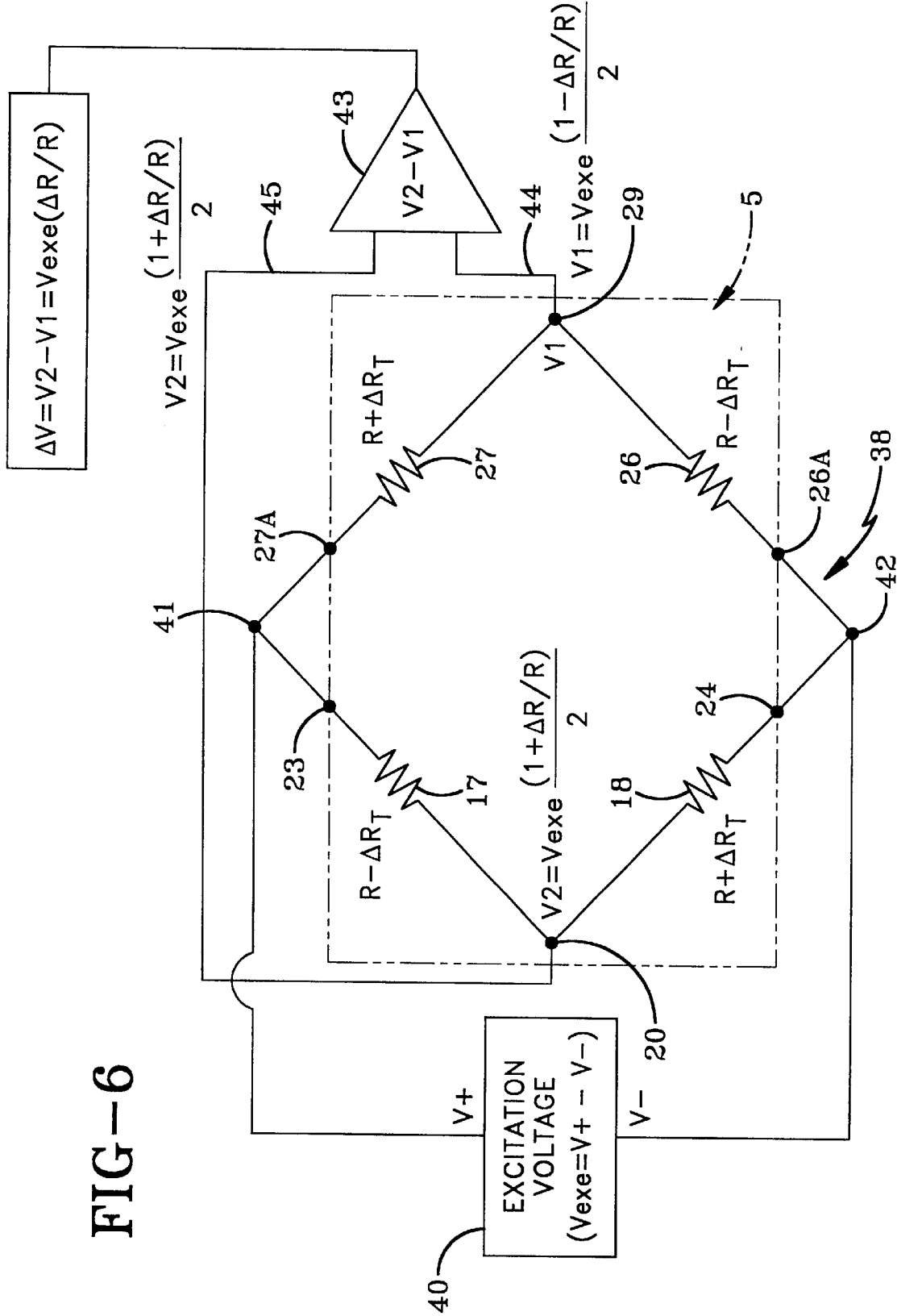
FIG. 6 is a schematic diagram of the bridge circuitry used with the mass flow sensor of FIG. 5.

FIG. 6 is a schematic circuit diagram of the Wheatstone bridge and shows the connections of the various resistors and an auxiliary amplifier 43 and excitation voltage 40 for providing the desired measurements and readout as the fluid stream passes over substrate 5. As shown in FIG. 6, resistors 17, 18, 26, and 27 are arranged as a Wheatstone bridge circuit and excitation voltage 40 is connected at terminals 41 and 42 to the legs of the Wheatstone bridge with the outputs from the Wheatstone bridge being connected to amplifier 43 by lines 44 and 45, which are connected to substrate terminal connectors 29 and 20, respectively. Once the sensor is powered by excitation voltage source 40, the voltage difference between the bridge output connections gives a reading scalable to the mass flow rate. Based on the direction of the measured flow, the temperature of the flow is measured by the upstream RTD 13 in the depicted embodiment. In FIG. 6, R is the resistance of the sensing elements and $\Delta R_T$ is the change of resistance due to cooling or heating from the fluid stream or airflow. Amplifier 43 produces an output $\Delta V$ which is the voltage $V_2-V_1$.

Figure 3:
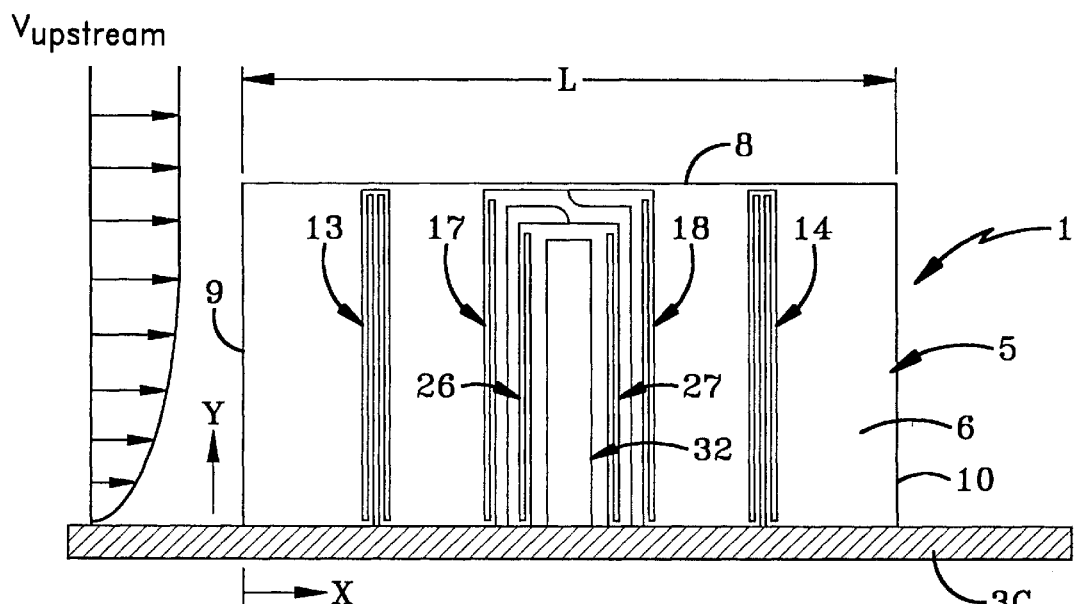
FIG. 3 is a side elevational view of the mass flow sensor mounted within the duct showing the free stream velocity profile as a function of distance above the duct.
Figure 4:
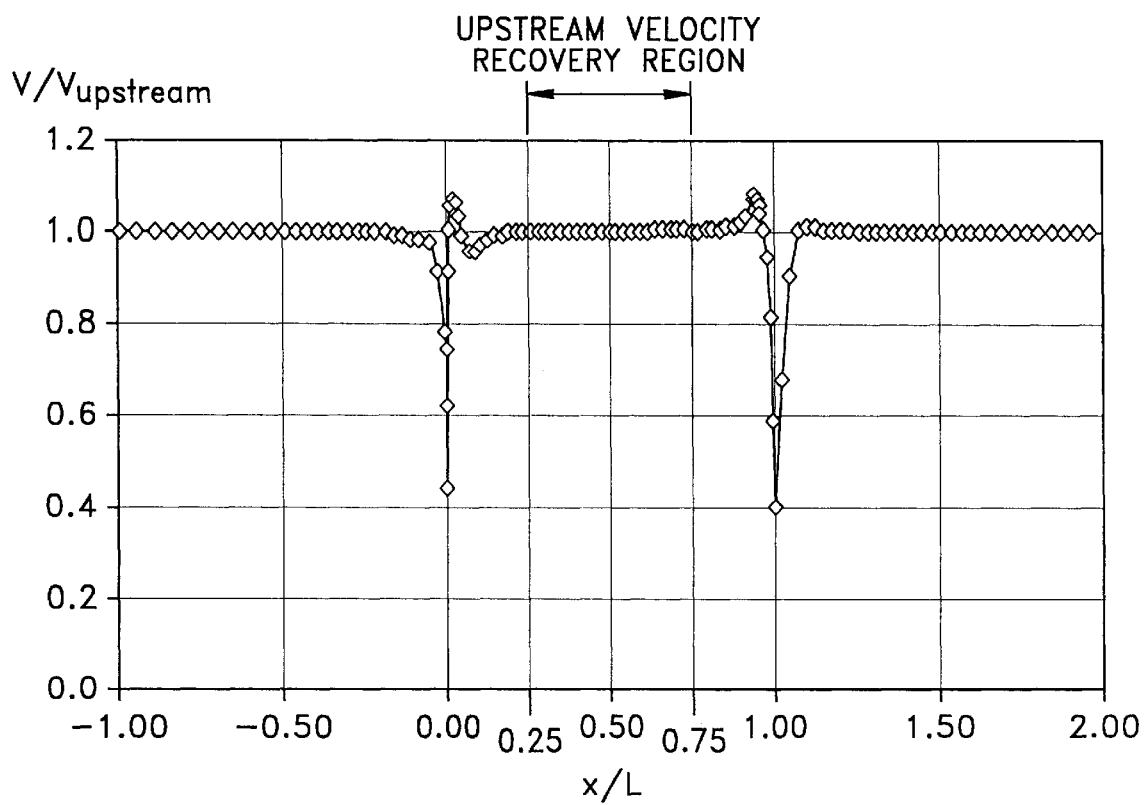
FIG. 4 is a diagrammatic view of the velocity distribution on the substrate.

In accordance with some of the main features of the invention, fluid stream 4 flows across the entire length (L) and height (H) of the substrate which has the various sensing and heating strips extending vertically throughout as shown in FIG. 2. The sensing strips 17, 18, 26, and 27 are centered on the surface of the substrate, sufficiently inward from the leading and trailing edges, so as to be located within the upstream recovery region (FIG. 4), so as to be unaffected by any disturbance of the fluid stream striking upstream edge 9 since the sensing elements are located sufficiently downstream from edge 9 to enable a constant stream velocity to be measured as shown in FIG. 4. Likewise the positioning of the sensing elements vertically throughout the height (H) of the substrate reduces any effects caused by the difference in velocity created near the duct floor 3C as shown by the velocity profile in FIG. 3.

Figure 7:
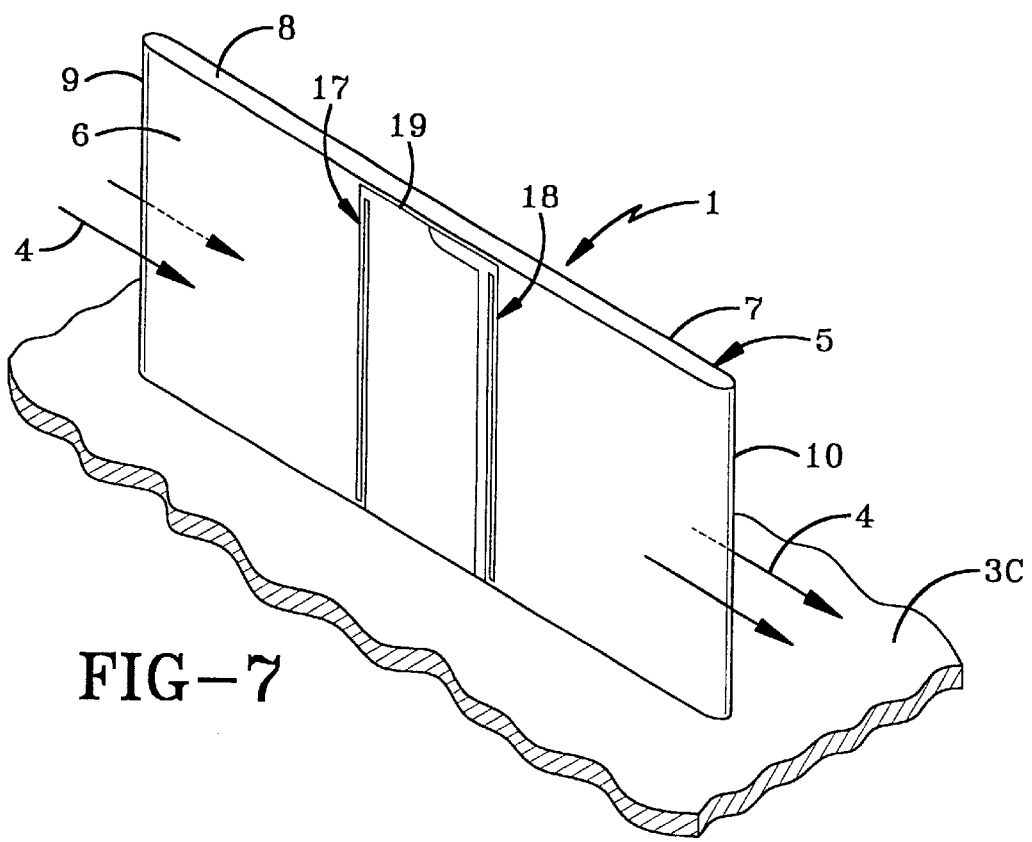
FIG. 7 is a fragmentary perspective view similar to FIG. 2 showing one side of a modified mass flow sensor.
Figure 8:
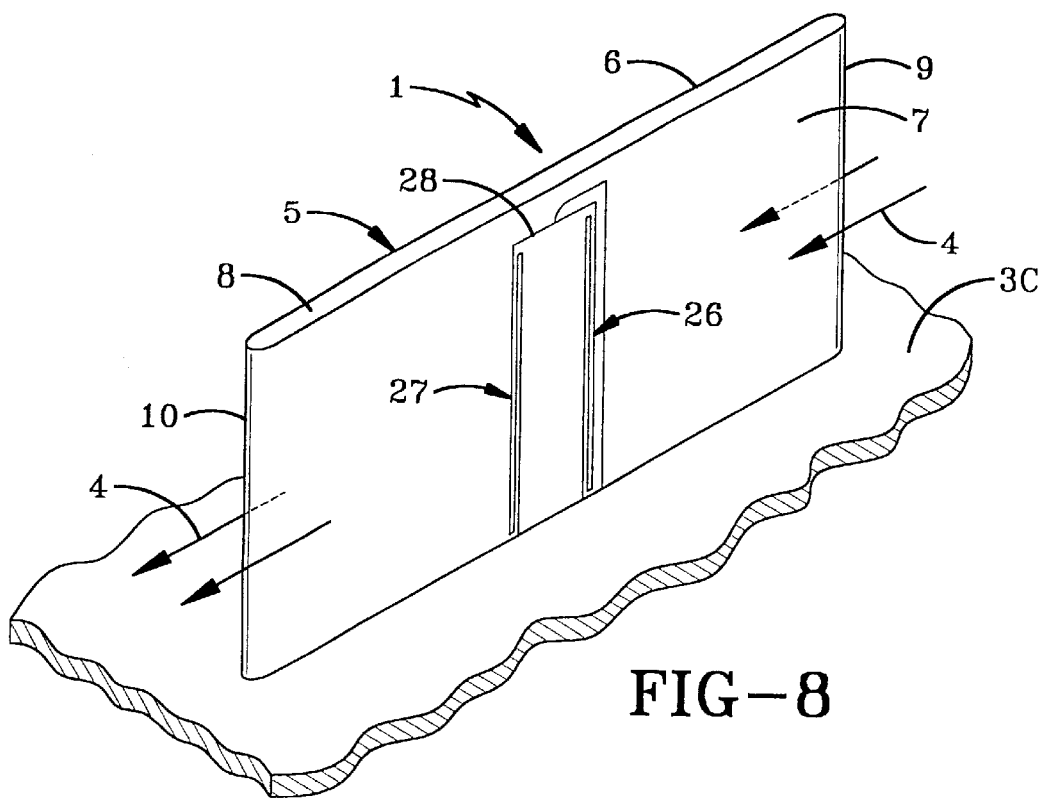
FIG. 8 is a fragmentary perspective view of the opposite side of the modified mass flow sensor of FIG. 8.

A modified embodiment of the mass flow sensor of the present invention is indicated at 50, and shown in FIGS. 7 and 8. Flow sensor 50 is similar to flow sensor 1 described above except that it eliminates heaters 32–34. Instead the resistors 17, 18, 26, and 27 are operated at a sufficient excitation voltage to cause them to increase in temperature so that as the air flow 4 moves over the resistors 17 and 26, they are cooled and the air flow is heated which is then sensed by downstream resistors 18 and 27, respectively.

In accordance with another feature of modified flow sensor 50 is that resistors 17 and 18 are positioned on side surface 6 of substrate 5 with resistors 26 and 27 being located on opposite surface 7 of substrate 5. This type of arrangement is effective and reduces the effect of unequal distribution of air flow across the sensor due to a particular orientation at which the substrate must be mounted in a particular configured duct or air flow tube.

It is also understood that duct 2 need not be square but could be round, oval or have other configurations without affecting the concept of the invention and that substrate 5 can extend into the duct from either of the sidewalls, top or bottom walls and at various angles, again without effecting the concept of the invention. Again, in flow sensor 50 as in flow sensor 1, resistors 17 and 26 will be located sufficiently downstream from the upstream edge 9 so that any disturbance caused by the air flow contacting front edge 9 is dissipated before flowing across heated resistors 17 and 26. The height of substrate 5 or its length of extension into the air stream, is not sufficient to materially increase the effect of the drag created on the moving air stream as it moves across the surfaces of the substrate as shown by the velocity ratio profile in FIG. 3. Substrate 5, and particularly, the height of the resistor strips, preferably extend at least one half of the height of the air flow depending upon the substrate's orientation in the duct, so as to reduce the effect of the reduced velocity adjacent the wall or walls of the duct, and by extending this substantial distance into the air flow stream includes nearly the entire velocity profile of the moving air stream across the resistors, as shown in FIG. 3.

Furthermore, as shown in the graph of FIG. 4, the incoming air flow will have a velocity represented at 1.0 but upon encountering upstream edge 9 and downstream edge 10 of substrate 5, will cause a disturbance and affect the velocity of the air stream, which if measured in this disturbed area, would provide inaccurate readings. However, by locating the sensing elements such as resistors 17 and 26 of flow sensor 50, behind the location represented by 0.25, with the trailing sensors, or resistors 18 and 27 of flow sensor 50, forward of the location represented by 0.75, they will be in a region in which the velocity is the same as the incoming velocity stream and unaffected by the disturbance created at leading edge 9 or trailing edge 10 of the substrate as the air stream moves around the substrate. Preferably, the resistors shown in FIGS. 7 and 8 of embodiment 50 will be located approximately ¼ of the length of the substrate inwardly from the leading and trailing edges thereof. It is readily understood that the start and end sensing elements of the mass flow sensor could be spaced further inwardly from the leading and trailing edges than the ¼ length discussed above, which would further ensure that the disturbance has dissipated by the time the air stream reaches the sensing elements. The relationships shown in FIG. 4 are the approximate minimums at which the sensing elements will be unaffected by the disturbance created by the leading and trailing edges of the substrate.

It is also understood that by the symmetrical location of the sensing elements of the substrate that sensors 1 and 50 are bidirectional, that is, they will measure the air flow whether the air flow is moving in the direction as shown by arrows 4 in the drawings, or in the reverse direction, without requiring modification of the sensors.

In accordance with another feature of the invention, the sensors and heating elements extend generally continuous throughout the length of the substrate and do not contain additional depositsor lengths of film strips on the substrate which do not contribute directly to providing the desired signals and reading as in the prior art sensors of U.S. Pat. Nos. 5,827,960 and 6,131,453. These sensors have additional lengths of film strips which cause a parasitic resistance thereby reducing the signal. Thus, in sensors 1 and 50 of the present invention, this parasitic resistance is very low and almost all of the resistance of the sensors participates in the measurement, thereby increasing the signal to noise ratio.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A sensor for measuring the mass flow of a fluid stream moving through a chamber comprising:

a thermal insulating substrate projecting into the chamber and extending in the direction of the fluid stream whereby said fluid stream flows past said substrate, said substrate having a leading and a trailing edge;

spaced first and second resistors on the substrate, said first resistor being located upstream in the fluid stream from the second resistor;

spaced third and fourth spaced resistors on the substrate, said third resistor being located upstream in the fluid stream from the fourth resistor;

said first, second, third and fourth resistors being located on said substrate a sufficient distance inwardly from the leading and trailing edges and having a height H approximately one-half or greater than the height of the fluid stream to be within the velocity recovery region of the fluid stream and to be subjected to nearly the entire velocity profile of the fluid stream as the stream moves across the resistors and past the substrate;

means for changing the temperature of the fluid stream as it passes between the first and second resistors and between the third and fourth resistors;

a Wheatstone bridge circuit having first, second, third and fourth legs, each of said legs containing a respective one of the first, second, third and fourth resistors; and an external circuit connected to the Wheatstone bridge circuit for receiving a signal from the Wheatstone bridge circuit and for developing an output signal indication of the fluid stream flowing through the chamber.

2. The sensor defined in claim 1 wherein the substrate has a length L measured in the direction of flow of the fluid stream across the substrate; and in which the first, second, third and fourth resistors are spaced inwardly from the leading and trailing edges of the substrate a distance at least ¼ of L.

3. The sensor defined in claim 1 wherein the substrate has a height H; and in which the first, second and third and fourth resistors extend substantially throughout the height H of the substrate.

4. The sensor defined in claim 1 wherein a pair of RTD's are mounted on the substrate, each of said RTD's being located adjacent to and spaced inwardly from a respective one of the leading and trailing edges of said substrate.

5. The sensor defined in claim 1 wherein the substrate has a pair of side surfaces which extend between the leading and trailing edges of the substrate; and in which the first and fourth resistors are located on one of the side surfaces and the second and third resistors are located on the other of said side surfaces.

6. The sensor defined in claim 1 wherein a heater is on the substrate and is located between the first and second resistors and between the third and fourth resistors to raise the temperature of the fluid stream as it moves between the first and second resistors and between the third and fourth resistors; and in which the Wheatstone bridge and external circuit senses the difference in temperature which corresponds to and provides the signed indication of the fluid stream flowing through the chamber.

7. The sensor defined in claim 1 wherein the external circuit include an amplifier and a positive and a negative excitation voltage.

8. The sensor defined in claim 1 wherein the substrate includes a plurality of terminal connectors, each connected to a respective one of the resistors; and in which said terminal connectors are located outside of the fluid stream.

9. The sensor defined in claim 1 wherein the substrate is quartz and the resistors are thin strips of platinum extending in a general parallel relationship with respect to each other and to the trailing and leading edges of the substrate.

10. The sensor defined in claim 1 wherein a pair of heaters are mounted on the substrate, with one of said heaters being located between the first and second resistors and the other of said heaters being located between the third and fourth resistors.

11. The sensor defined in claim 1 wherein the substrate is an electrically insulating material capable of withstanding the high temperatures produced by the heater, and the resistors and the heater are thin strips of a material whose electrical resistance varies with temperature in a known and predictable way.

12. The sensor defined in claim 11 wherein the insulating material is quartz.

13. The sensor defined in claim 11 wherein the insulating material is aluminum oxide.

14. The sensor defined in claim 11 wherein the heater and resistors are platinum.

15. The sensor defined in claim 11 wherein the heater and resistors are nickel.

16. In combination, a fluid duct and a sensor mounted in said duct for measuring the mass flow of a fluid stream moving through said duct and past said sensor, said combination comprising:

a thermal insulating substrate projecting into the duct, said substrate having opposed sides and trailing and leading edges, said sides extending in the direction of the fluid stream whereby said fluid stream flows past said sides of the substrate;

spaced first and second resistors on the substrate, said first resistor being located upstream in the fluid stream from the second resistor;

spaced third and fourth spaced resistors on the substrate, said third resistor being located upstream in the fluid stream from the fourth resistor;

said first, second, third and fourth resistors being located on said substrate a sufficient distance inwardly from the leading and trailing edges and having a height H approximately one-half or greater than the height of the fluid stream to be within the velocity recovery region of the fluid stream and to be subjected to nearly the entire velocity profile of the fluid stream as the stream moves across the resistors and past the substrate;

means for changing the temperature of the fluid stream as it passes between the first and second resistors and between the third and fourth resistors;

a Wheatstone bridge circuit having first, second, third and fourth legs, each of said legs consisting of a respective one of the first, second, third and fourth resistors; and an external circuit connected to the Wheatstone bridge circuit for receiving a signal from the Wheatstone bridge circuit and for developing an output signal indication of the fluid stream flowing through the chamber.

17. The combination defined in claim 16 wherein the side of the substrate has a length L; and in which all of the resistors are spaced inwardly from the leading and trailing edges a distance at least ¼ of L.

18. The combination defined in claim 16 wherein the substrate has a height H; and in which the first, second and third and fourth resistors extend substantially throughout the height H of the substrate.

19. The combination defined in claim 16 wherein the substrate includes a plurality of terminal connectors, each connected to a respective one of the resistors; and in which said terminal connectors are located outside of the fluid stream.

20. The combination defined in claim 16 wherein the substrate is quartz and the resistors are all thin strips of platinum extending in a general parallel relationship with respect to each other and to the trailing and leading edges of the substrate.

21. The combination defined in claim 16 wherein the means for changing the temperature of the fluid stream includes a pair of heaters mounted on the substrate, with one of said heaters being located following the first and second resistors and the other of said heaters being located preceeding the third and fourth resistors.

* * * * *